United States Patent
Yi et al.

(10) Patent No.: US 8,675,629 B2
(45) Date of Patent: Mar. 18, 2014

(54) TIMING ADJUSTMENT FOR EXTENDING THE WIRELESS RANGE OF A VEHICLE TELEMATICS UNIT

(75) Inventors: Ki Hak Yi, Windsor (CA); Eray Yasan, Canton, MI (US)

(73) Assignee: General Motors LLC, Detroit, MI (US)

( * ) Notice: Subject to any disclaimer, the term of this patent is extended or adjusted under 35 U.S.C. 154(b) by 183 days.

(21) Appl. No.: 13/169,313

(22) Filed: Jun. 27, 2011

(65) Prior Publication Data

US 2012/0327918 A1 Dec. 27, 2012

(51) Int. Cl.
*H04B 7/212* (2006.01)
*H04J 3/06* (2006.01)
*G06F 7/00* (2006.01)

(52) U.S. Cl.
USPC .......................... 370/347; 370/508; 701/32.5

(58) Field of Classification Search
USPC ......... 370/321, 337, 350, 442, 458, 503, 508; 701/32.5, 492
See application file for complete search history.

(56) References Cited

U.S. PATENT DOCUMENTS

| | | | |
|---|---|---|---|
| 5,615,215 A * | 3/1997 | Utting et al. | 370/337 |
| 5,642,355 A * | 6/1997 | Smith | 370/337 |
| 5,959,982 A * | 9/1999 | Federkins et al. | 370/336 |
| 6,169,887 B1 * | 1/2001 | Cordell et al. | 455/242.2 |
| 6,192,247 B1 * | 2/2001 | Dillon et al. | 455/446 |
| 6,633,559 B1 * | 10/2003 | Asokan et al. | 370/350 |
| 8,050,246 B2 * | 11/2011 | Wala et al. | 370/347 |
| 2007/0019667 A1 * | 1/2007 | Mottier et al. | 370/458 |
| 2009/0079483 A1 * | 3/2009 | Keskin et al. | 327/161 |
| 2011/0035476 A1 * | 2/2011 | Imbimbo et al. | 709/222 |

* cited by examiner

*Primary Examiner* — Warner Wong
(74) *Attorney, Agent, or Firm* — Anthony Luke Simon; Reising Ethington P.C.

(57) ABSTRACT

A system and method of extending the range of a vehicle telematics unit includes determining that a vehicle telematics unit is outside of a geographic range beyond which time division multiple access (TDMA) transmissions sent from the vehicle telematics unit to a base station arrive at the base station after a time slot allocated to the vehicle telematics unit in a time frame has passed; calculating a time delay that causes the TDMA transmissions to arrive at the base station in the allocated time slot of a subsequent time frame; and sending TDMA transmissions from the vehicle telematics unit at a time determined using the time delay.

17 Claims, 4 Drawing Sheets

TIMING ADJUSTMENT FOR EXTENDING
THE WIRELESS RANGE OF A VEHICLE
TELEMATICS UNIT

TECHNICAL FIELD

The present invention relates generally to vehicles and more particularly to wireless communications using a vehicle telematics unit.

BACKGROUND OF THE INVENTION

Vehicles use telematics devices to communicate voice conversations and data with telematics call centers as well as third party recipients. These devices use hardware that is integrated with the vehicle, such as a dedicated antenna. Often, the telematics devices use cellular/wireless carriers to send and receive wireless communications to and from the call centers or third party recipients through the dedicated antenna. However, the cellular/wireless carriers may not be configured to optimally take advantage of some telematics device features. For example, the cellular/wireless carrier may be optimized for use with hand-held wireless devices to the detriment of vehicle telematics devices. That is, telematics devices may have a more powerful antenna than a hand-held wireless device. As a result, the cellular/wireless carriers may not be configured to take advantage of this difference (as well as others). While existing telematics devices can easily communicate using cellular/wireless carriers, it is possible to increase the performance of telematics devices with respect to these carriers.

SUMMARY OF THE INVENTION

According to an aspect of the invention, there is provided a method of extending the range of a vehicle telematics unit. The steps include determining that a vehicle telematics unit is outside of a geographic range beyond which time division multiple access (TDMA) transmissions sent from the vehicle telematics unit to a base station arrive at the base station after a time slot allocated to the vehicle telematics unit in a time frame has passed; calculating a time delay that causes the TDMA transmissions to arrive at the base station in the allocated time slot of a subsequent time frame; and sending TDMA transmissions from the vehicle telematics unit at a time determined using the time delay.

According to another aspect of the invention, there is provided a method of extending the range of a vehicle telematics unit. The steps include determining that a vehicle telematics unit is located more than a predetermined distance from a base station based on an inability of the base station to receive a signal burst from the telematics unit during a time slot of a time frame; determining the range of the vehicle to the base station using a radio frequency (RF) signal transmitted between the base station and the vehicle telematics unit; calculating a time delay based on the determined range that causes time division multiple access (TDMA) communications sent from the vehicle telematics unit to arrive at the base station during the time slot of a subsequent time frame; activating a switch that electrically connects the vehicle telematics unit to an antenna via a delay circuit; delaying the TDMA communications from the vehicle telematics unit by passing the TDMA communications through the delay circuit to the antenna; and transmitting the TDMA communications from the antenna to the base station.

According to yet another aspect of the invention, there is provided a method of extending the range of a vehicle telematics unit. The steps include sending a time division multiple access (TDMA) signal burst from a vehicle telematics unit to a base station using a random access channel (RACH); receiving a message at the vehicle telematics unit from the base station via a radio frequency (RF) signal that includes the time the base station sent the message, which the vehicle telematics unit uses to determine the distance between the vehicle and the base station in response to the sent signal burst; using the received message to determine that the vehicle is beyond a range accommodated by a maximum advance timing value generated by the base station, which indicates that signal bursts sent by the vehicle telematics unit would not arrive at the base station within a time slot allocated to the vehicle telematics unit in a time frame; calculating at the vehicle telematics unit an amount of time to delay sending additional signal bursts so that they will arrive at the time slot allocated to the vehicle telematics unit in a subsequent time frame; and delaying the transmission of additional signal bursts sent from the vehicle telematics unit to the base station by the calculated amount of time to delay so that it arrives in the allocated time slot in the subsequent time frame.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENTS

Figure 1:
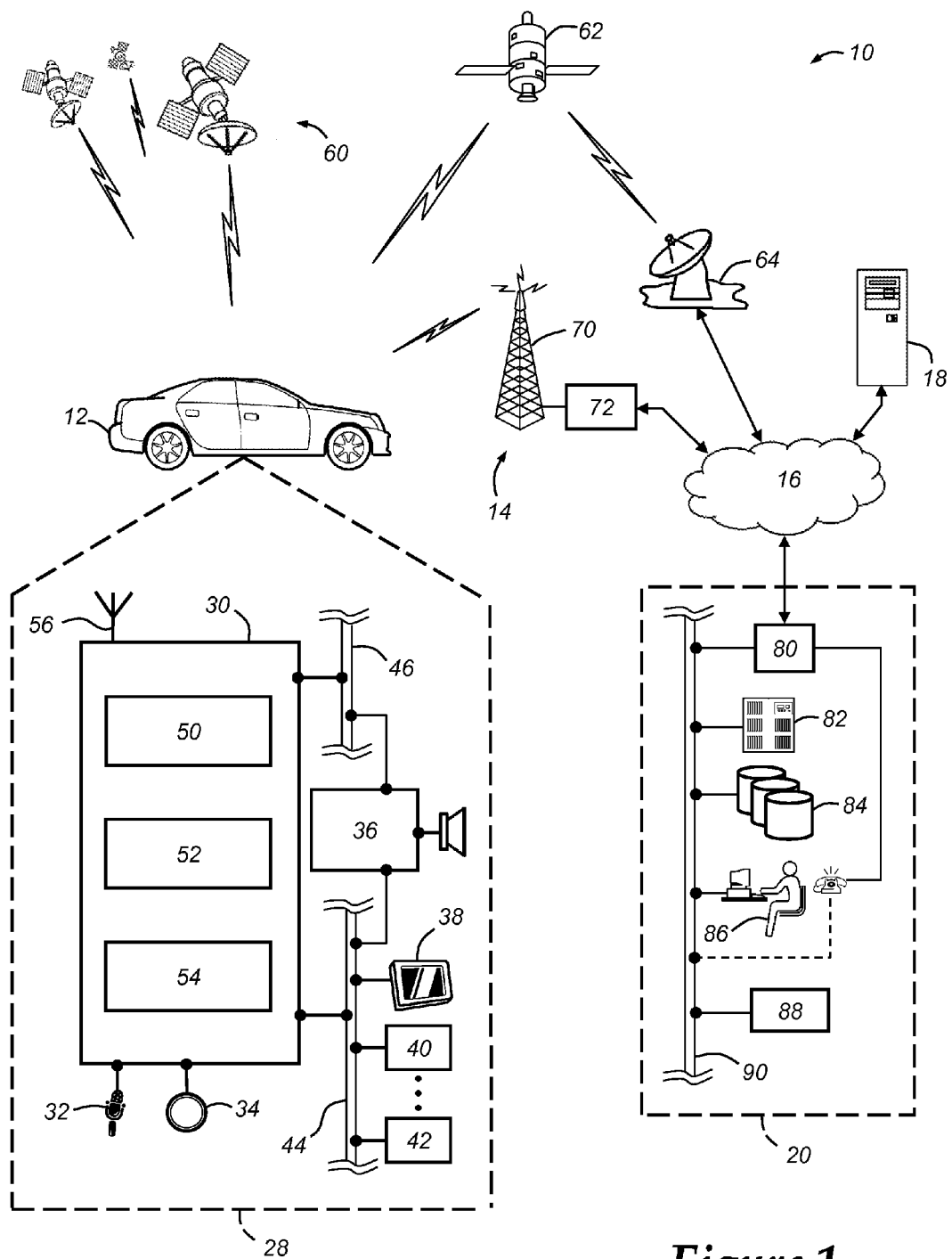
FIG. 1 is a block diagram depicting an exemplary embodiment of a communications system that is capable of using the method disclosed herein.

The system and method described below involve extending the range of a vehicle telematics unit. In TDMA cellular technologies, the range of a wireless device may be limited not by the location of a device and/or signal strength of the antenna, but rather a predefined distance specified by one or more technological standards. TDMA generally uses channel-access cellular communications that allows several wireless devices to share the same frequency channel by dividing the channel into different time slots. The TDMA channel can be described as using a plurality of time slots in each of a succession of time frames. A time frame can be divided into a plurality of time slots (e.g. eight). Each of the eight time slots can be assigned to a different wireless device and during each of the eight time slots the device assigned to the slot can broadcast a signal for receipt at a base station. In order for a wireless device to successfully transmit a signal to the base station in such a way that the signal will successfully arrive during its assigned time slot, the wireless device can compensate for its distance from the base station. That way, the amount of time used for signal transmission uses can be compensated for depending on the distance of the wireless device from the base station.

TDMA systems include instructions for time delays relating to signal transmission. For example, a TDMA signal sent from a cellular base station—such as is used in a GSM cellular system—can include an instructional value to be used for timing a transmission from the wireless device. This value can be referred to as the timing advance value, which can correspond to the length of time a signal takes to reach the base station from the wireless device. The timing advance value in a GSM system is specified in the Third Generation Partnership Project technical standard (3GPP TS) 45.10 and can be described as a value between 0 and 63, the marginal increase of which compensates for a distance of approximately 550 meters (m) between the base station and the wireless device. Given the distance-per-value of 550 m and the upper value of 63, the current range of a TDMA signal can be limited to approximately 35 kilometers (km). For example, if the base station is 35 km from the wireless device, then the base station can transmit a signal to the wireless device that includes a timing advance value of 63, which directs the wireless device to advance the transmission to the base station by approximately 233 microseconds (μs) (e.g. 2*35 km/300,000 km/s) in order for it to arrive at the base station during the appropriate time slot in a time frame.

However, vehicles having telematics units often have an antenna that is more powerful and/or better located than those of handheld wireless devices. In those cases, the distance over which the telematics unit can send and receive communications is greater than the 35 km range specified by TDMA protocols. Some attempts have been made to extend this range. One of those attempts involves dedicating two time slots that are adjacent to each other in one time frame for receiving communications from the wireless device. Or in other words, in addition to the time slot normally assigned to the wireless device, another time slot adjacent to and occurring immediately after the assigned time slot can also be dedicated to the reception of transmissions from that device. But the use of two adjacent time slots can reduce the number of wireless devices that communicate with the base station per time frame because it reduces the number of time slots that are available for unique wireless devices in each time frame by half.

On the other hand, it is possible to expand the range of wireless device using TDMA without halving the available time slots. For instance, a timing delay can be calculated so that the telematics units located outside of the specified range of the base station (e.g. further than 35 km away) can send transmissions to the base station in such a way that they arrive in the time slot assigned to the telematics unit thereby eliminating the use of two adjacent time slots in extended range applications. Rather than arriving in the second slot of two adjacent time slots, the timing delay can be used to delay transmissions from the telematics unit so that they arrive in the assigned time slot of the next or subsequent time frame. Or in other words, the timing delay can become a maximum timing advance that can time the arrival of a transmission during the assigned time slot of the next frame. This will be discussed in more detail below.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. In one implementation, the computer 18 can use a database that includes cellular registration data and can be accessed to obtain that data. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
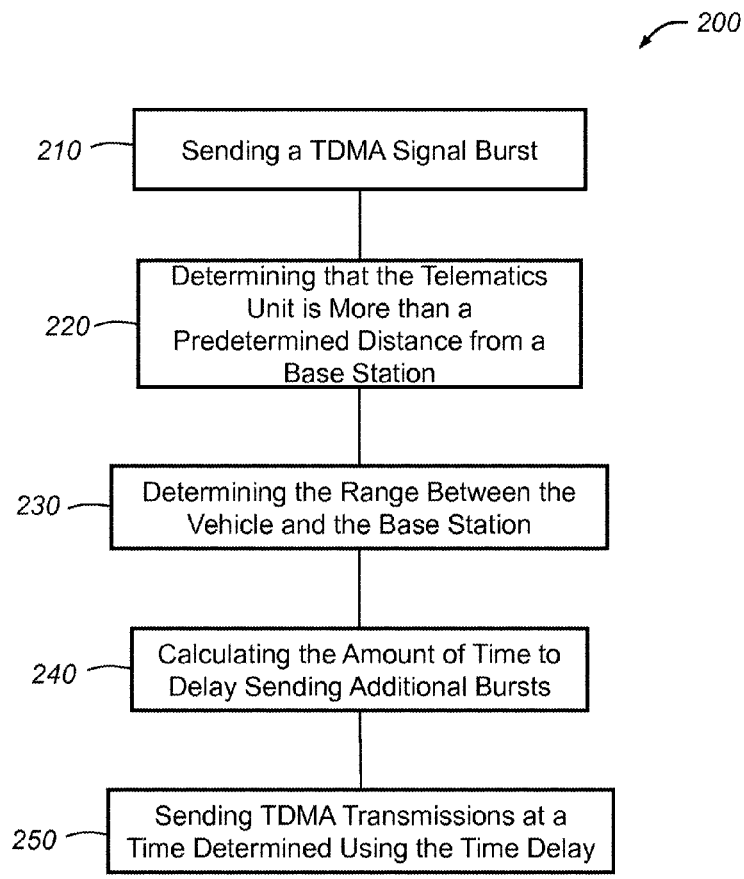
FIG. 2 is a flow chart of a method of extending the range of a vehicle telematics unit.

Turning now to FIG. 2, there is a method 200 of extending the range of a vehicle telematics unit 30. The method 200 begins at step 210 by sending a time division multiple access (TDMA) signal burst from the telematics unit 30 to a base station (such as can be located at cell tower 70) using a random access channel (RACH). The RACH is a control channel that can be used by a wireless device or telematics unit 30 in a GSM cellular system to request access to the wireless carrier system 14. The RACH includes a number of time slots that can be assigned to wireless devices, such as the telematics unit 30. When the telematics unit 30 attempts to contact the wireless carrier system 14, the unit 30 can broadcast a signal burst that is intended to arrive at the base station during the time slot assigned to the telematics unit 30. When the base station detects the signal burst on an access channel, such as the RACH or other similar channel (e.g. a packet random access channel (PRACH)), the base station can measure the delay of the signal burst relative to the expected signal delay from the telematics unit 30 if the unit 30 were located next to the base station (i.e. assuming the distance between the telematics unit 30 and the base station is zero). If the telematics unit 30 is relatively close to the base station, then little if any timing advance is needed to ensure that the signal burst arrives at the base station in a timely manner. However, the base station can use the measured delay to calculate the distance between the telematics unit 30 and the base station to determine an appropriate timing advance value to send to the telematics unit 30. And if the telematics unit 30 is within the ~35 km range discussed above, the base station can send the telematics unit 30 an appropriate timing advance value that ranges between 0-63 depending on the distance between the telematics unit 30 and the base station. The method 200 proceeds to step 220.

At step 220, the vehicle telematics unit is determined to be located more than a predetermined distance from a base station. This determination can be based on a number of factors, such as an inability of the base station to receive the signal burst during a time slot of a time frame. A cause of this inability to receive the signal burst can be that the telematics unit 30 is located outside of the ~35 km range within which the base station accommodates the propagation delay imparted by the distance of the vehicle 12 from the base station using the timing advance values. It is possible that the vehicle telematics unit 30 has attempted to contact the base station via the RACH using one or more signal bursts. If the attempt(s) to contact the base station have not been successful, then the telematics unit 30 can decide that the vehicle 12 is beyond the range the base station accommodates. The method 200 proceeds to step 230.

At step 230, the range of the vehicle to the base station is determined using a radio frequency (RF) signal transmitted between the base station and the vehicle telematics unit 30. The RF signal can include a message that is received at the vehicle telematics unit 30 from the base station. The message can tell the telematics unit 30 the time the base station sent the message, which can be used to determine the distance between the vehicle 12 and the base station in response to the inability of the base station to receive a signal burst. It is possible that this message can be carried out using a slow associated control channel (SACCH) message. In another example, the telematics unit 30 can include the time at which it sends the RF signal in the transmission of the RF signal to the base station (e.g. using the clock included with the GPS module 40). When the base station receives the RF signal, it can record the time of receipt and subtract it from the time at which the telematics unit 30 sent the RF signal. The base station can then send the time of receipt and/or the subtraction results back to the telematics unit 30. The difference between the time at which the RF signal is sent and the time at which it is received can be used to determine how far the telematics unit 30 is from the base station. If the base station fails to receive a response to the transmission of the RF signal, it is possible to apply a standard amount of time to delay sending additional signal bursts and skip to step 250. In one example, the standard amount of time to delay can be set as 4142 µs, the calculation of which is discussed in more detail below.

The received message can also be used at least partly to determine that the vehicle 12 is beyond a range accommodated by a maximum advance timing value generated by the base station. The amount of time between sending and receiving the RF signal and/or the message it includes can indicate to the telematics unit 30 that signal bursts sent by the vehicle telematics unit 30 would not arrive at the base station within a time slot allocated to the vehicle telematics unit 30 in a particular time frame. The range—such as a geographic range—can delineate a boundary beyond which TDMA transmissions sent from the telematics unit 30 to the base station would arrive at the base station after the time slot allocated to the vehicle telematics unit in a time frame has passed. This determination can optionally be carried out or confirmed using the GPS module 40 onboard the vehicle 12 to compare the location of the vehicle 12 to a known or determined base station location in order to confirm that the vehicle 12 is indeed beyond the range within which the base station can direct the telematics unit 30 to compensate for its distance from the base station using timing advance values. The method 200 proceeds to step 240.

At step 240, an amount of time to delay sending additional signal bursts (or other TDMA transmissions) is calculated at the vehicle telematics unit 30 so that they will arrive in a time slot allocated to the vehicle telematics unit 30 in a subsequent time frame. Once it is determined that the vehicle 12 is beyond a range within which a timing advance value between 0-63 will sufficiently advance transmissions from the vehicle 12 so that they arrive in an appropriate or assigned time slot of a time frame, the telematics unit 30 can calculate a time delay for sending the signal burst to arrive in its time slot in a subsequent time frame. For example, a timing advance value of 63 can advance the transmission of signal bursts from the telematics unit 30 by approximately 236 µs (64 multiplied by 3.6923 µs per timing advance value or bit). Given that each timing advance value compensates for approximately 550 m, a timing advance value of 63 can compensate for 35 km of distance between the telematics unit 30 and the base station.

However, when the telematics unit 30 is beyond this 35 km boundary, the telematics unit 30 can plan for its signal burst to arrive at the base station in the subsequent time frame. In doing so, the telematics unit 30 can determine or know the maximum amount of time advance that can be used in order for the signal burst to arrive in the assigned time slot of a first time frame. In this example, that amount of time is 236 µs. Knowing that a timing advance of 236 µs will not compensate for the distance of the vehicle 12 beyond 35 km, the telematics unit 30 can double the timing advance thereby increasing the boundary to roughly 70 km. In doing so, the telematics unit 30 can determine or know the duration of the time frame (in this case, eight time slots; approximately 4615 µs) and subtract from that duration the maximum timing advance allowed by the base station (236 µs) in the time frame it would have originally had to send the signal burst if it were less than 35 km from the base station as well as the maximum timing advance that would be permitted in the time slot assigned to the telematics unit 30 in the subsequent time frame, which is another 236 µs. In this example, the amount of time to delay sending additional signal bursts from the vehicle 12 can be ~4142 µs (4615 µs of the original time frame subtracted by two timing advance values, each having a duration of 236 µs). This amount of time delay may be sufficient to permit the telematics unit 30 on a vehicle 12 that is located between 35-70 km from the base station to successfully send signal bursts to that base station. While the calculated amount of time to delay sending signal bursts in the example above can extend the range of the telematics unit 30 to 70 km, the amount of time delay can be determined based on a distance between the vehicle 12 and the base station. Or in other words, the time delay can be increased or decreased based on the distance of the vehicle 12 to the base station. For instance, the range of the telematics unit 30 to the base station could be tripled, quadrupled, or more using the techniques described above. The range of the vehicle 12 to the base station can be a function of the strength of signal from the base station and/or the power of the antenna used with the telematics unit 30. The method 200 proceeds to step 250.

At step 250, the TDMA transmissions are sent at a time determined using the time delay. That is, the transmission of TDMA transmissions or additional signal bursts sent from the telematics unit 30 to the base station can be delayed by the calculated amount of time to delay so that it arrives in the allocated time slot in the subsequent time frame. In one embodiment, this includes activating a switch that electrically connects the vehicle telematics unit 30 to the antenna 56 via a delay circuit. The delay circuit can include a variety of electrical components that can delay the transmission of a signal. The TDMA communications or signal bursts passed through the delay circuit from the vehicle telematics unit 30 can be passed to the antenna 56 where they are ultimately communicated to the base station. The method 200 then ends.

Figure 3:
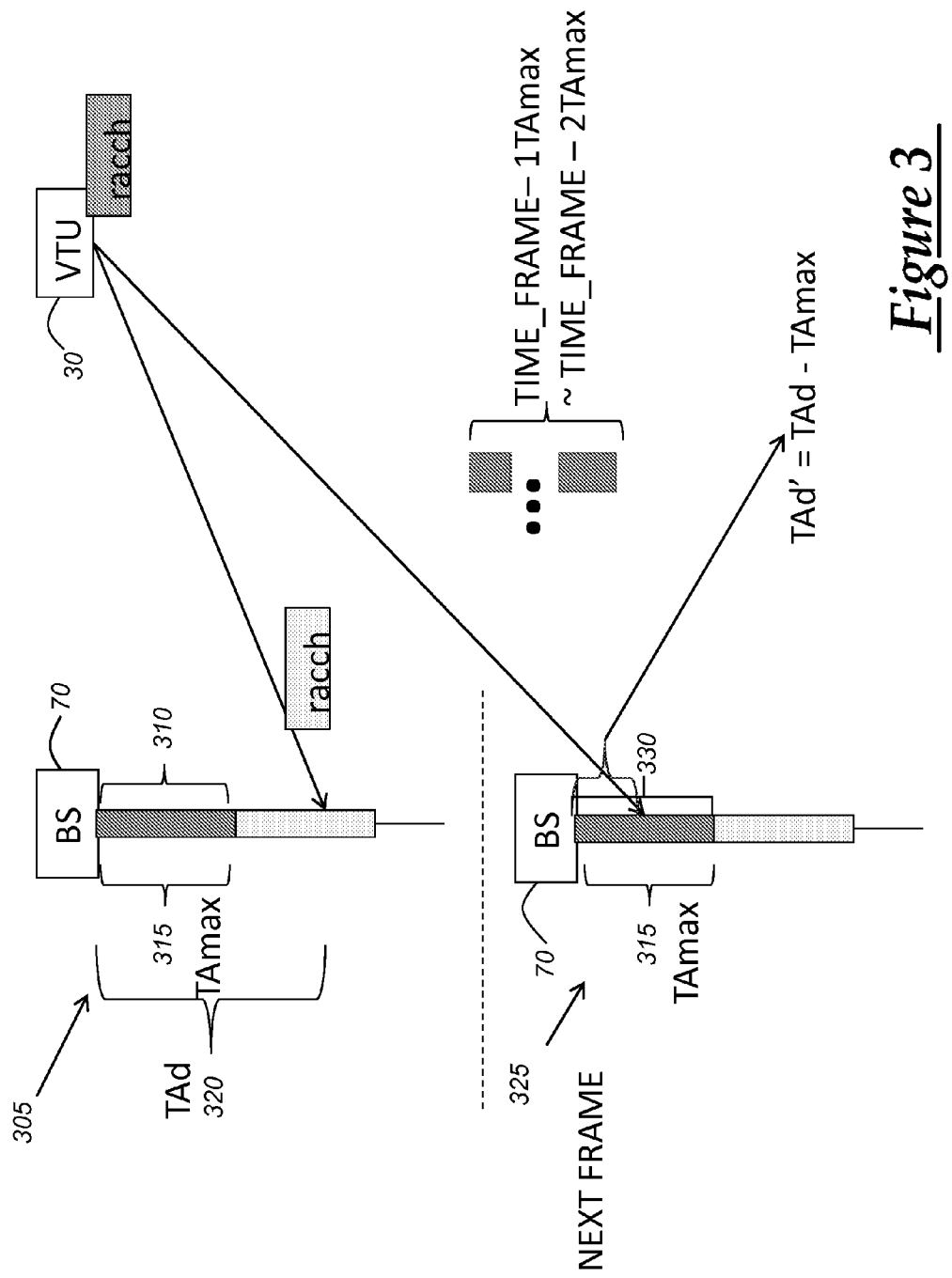
FIG. 3 is a block diagram of a portion of a method of extending the range of a vehicle telematics unit.

With respect to FIG. 3, a portion of a method of extending the range of a vehicle telematics unit is shown and is described in conjunction with elements and concepts described above. In the upper part of FIG. 3, a portion of a first time frame 305 is shown. The first time frame 305 can include eight time slots, however, only two time slots are shown. A first time slot of the first time frame 310 can be assigned to receive transmissions from the telematics unit 30 and the slot 310 can have a temporal duration TAmax 315 during which the base station in the cell tower 70 can receive transmissions from the telematics unit 30. In some cases, the telematics unit 30 may be beyond a range in which transmissions from the unit 30 can reach the base station during TAmax 315 and the amount of time that elapses between sending the transmission from the telematics unit 30 and receiving the transmission at the base station is greater than TAmax 315. This amount of time is shown as TAd 320. As can be appreciated in FIG. 3, transmissions arriving at the base station as TAd 320 arrive outside of the first time slot of the first time frame 310. To compensate for this, the telematics unit 30 can introduce a time delay so that the transmission can arrive during TAmax 315 of a second time frame 325. As is shown in the lower part of FIG. 3, a time delay can be introduced into the transmission such that it arrives during a first time slot of a second time frame 330.

Figure 4:
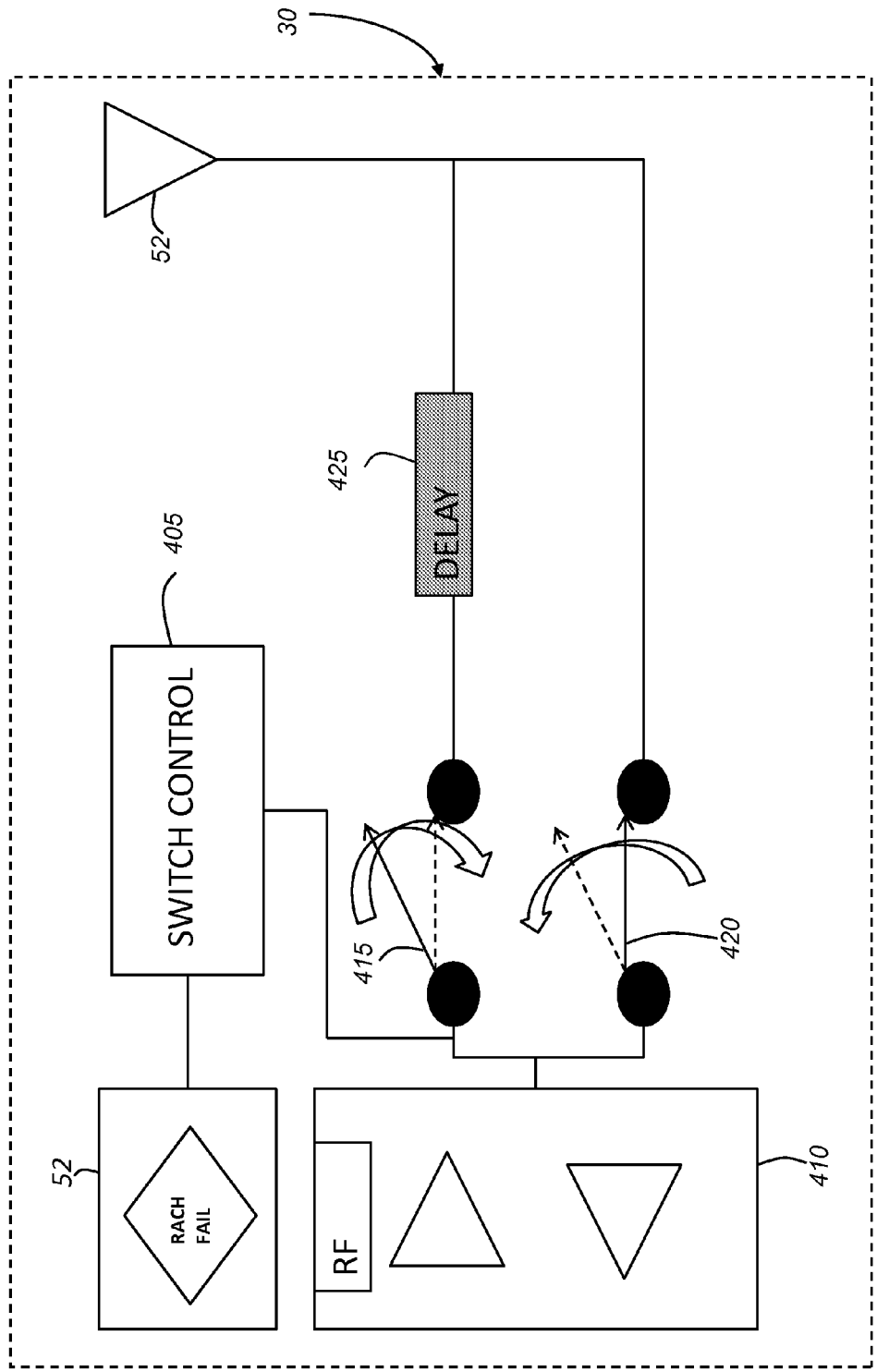
FIG. 4 is a block diagram depicting an exemplary embodiment of hardware used to carry out a method of extending the range of a vehicle telematics unit.

Turning now to FIG. 4, a block diagram depicts an exemplary implementation of hardware that can be used to carry out part of the method described herein. FIG. 4 generally shows a portion of the telematics unit 30 that includes a processor 52, a switch controller 405, a radio frequency (RF) transceiver 410, an antenna 56 (described above with regard to FIG. 1), and two switches 415, 420 that can selectively communicate transmissions from the RF transceiver 410 through delay circuitry 425 to the antenna 56. During normal operation, which can occur when the telematics unit 30 is located within 35 km from the base station, the switch controller 405 can maintain switch 415 in an open position while maintaining switch 420 in a closed position. This configuration can direct RF transmissions from the RF transceiver 410 through switch 420 to the antenna 56. If telematics unit 30 determines that a transmission, such as a RACH signal burst, has failed to reach the base station, the unit 30 can direct the switch controller 405 to open switch 420 and close switch 415 thereby communicating transmissions from the RF transceiver 410 through delay circuitry 425 to the antenna 56. The delay circuitry 425 can be configurable to introduce a specific amount of time delay before the transmission reaches the antenna 56. It should be appreciated that the telematics unit 30 can carry out the functions of detecting transmission failure and controlling switches in a variety of ways. In one example, the processor 52 discussed above in conjunction with FIG. 1 can detect transmission failure and provide direction to the switch controller 405, but other implementations are possible.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of extending the range of a vehicle telematics unit, comprising the steps of:
   (a) determining that a vehicle telematics unit is outside of a geographic range beyond which time division multiple access (TDMA) transmissions sent from the vehicle telematics unit to a base station arrive at the base station after a time slot allocated to the vehicle telematics unit in a time frame has passed;
   (b) calculating a time delay that causes the TDMA transmissions to arrive at the base station in the allocated time slot of a subsequent time frame, wherein calculating comprises subtracting both a maximum timing advance of the time frame as well as a maximum timing advance of the subsequent time frame from the length of time of the time frame to calculate the time delay; and
   (c) sending TDMA transmissions from the vehicle telematics unit at a time determined using the time delay.

2. The method of claim 1, wherein the determination in step (a) is based on an inability of the base station to receive a signal burst from the vehicle telematics unit.

3. The method of claim 1, wherein step (a) further comprises using a global positioning receiver (GPS) module that is carried by the vehicle to determine if the vehicle is outside of the geographical range.

4. The method of claim 1, further comprising the step of determining that the vehicle is outside of the geographical range based on an RF signal communicated between the vehicle telematics unit and the base station that includes the time at which the RF signal was sent.

5. The method of claim 1, wherein step (a) further comprises sending a TDMA signal burst from the vehicle telematics unit over a random access channel (RACH) or a packet random access channel (PRACH) that is unsuccessfully received at the base station.

6. The method of claim 1, wherein the geographical range is defined by timing advance values sent from the base station.

7. The method of claim 1, wherein the calculated time delay doubles a maximum timing advance for the time frame.

8. The method of claim 1, wherein the length of the calculated time delay varies depending on how far beyond the geographical range the vehicle is located.

9. The method of claim 1, wherein the calculated time delay is a function of the power of an antenna used with the vehicle telematics unit.

10. The method of claim 1, wherein step (c) further comprises activating a switch that electrically connects the vehicle telematics unit to an antenna through a delay circuit that delays the transmission of signals from the vehicle telematics unit to the base station by the calculated time delay.

11. A method of extending the range of a vehicle telematics unit, comprising the steps of:
   (a) determining that a vehicle telematics unit is located more than a predetermined distance from a base station based on an inability of the base station to receive a signal burst from the telematics unit during a time slot of a time frame;
   (b) determining the range of the vehicle to the base station using a radio frequency (RF) signal transmitted between the base station and the vehicle telematics unit;
   (c) calculating a time delay based on the determined range that causes time division multiple access (TDMA) communications sent from the vehicle telematics unit to arrive at the base station during the time slot of a subsequent time frame, wherein the calculating comprises subtracting both a maximum timing advance of the time frame as well as a maximum timing advance of the subsequent time frame from the length of time of the time frame to calculate the time delay;

(d) activating a switch that electrically connects the vehicle telematics unit to an antenna via a delay circuit;

(e) delaying the TDMA communications from the vehicle telematics unit by passing the TDMA communications through the delay circuit to the antenna; and (f) transmitting the TDMA communications from the antenna to the base station.

12. The method of claim 11, wherein step (a) further comprises using a global positioning receiver (GPS) module that is carried by the vehicle to determine if the vehicle is outside of the geographical range.

13. The method of claim 11, wherein step (a) further comprises sending the signal burst from the vehicle telematics unit over a random access channel (RACH) or a packet random access channel (PRACH).

14. The method of claim 11, wherein the calculated time delay is a function of the power of an antenna used with the vehicle telematics unit.

15. A method of extending the range of a vehicle telematics unit, comprising the steps of:

(a) sending a time division multiple access (TDMA) signal burst from a vehicle telematics unit to a base station using a random access channel (RACH) or a packet random access channel (PRACH);

(b) receiving a message at the vehicle telematics unit from the base station via a radio frequency (RF) signal that includes the time the base station sent the message, which the vehicle telematics unit uses to determine the distance between the vehicle and the base station in response to the sent signal burst;

(c) using the received message to determine that the vehicle is beyond a range accommodated by a maximum advance timing value generated by the base station, which indicates that signal bursts sent by the vehicle telematics unit would not arrive at the base station within a time slot allocated to the vehicle telematics unit in a time frame;

(d) calculating at the vehicle telematics unit an amount of time to delay sending additional signal bursts so that they will arrive at the time slot allocated to the vehicle telematics unit in a subsequent time frame, wherein the calculation comprises subtracting both a maximum timing advance of the time frame as well as a maximum timing advance of the subsequent time frame from the length of time of the time frame to calculate the time delay; and (e) delaying the transmission of additional signal bursts sent from the vehicle telematics unit to the base station by the calculated amount of time to delay so that it arrives in the allocated time slot in the subsequent time frame.

16. The method of claim 15, wherein the calculated time delay doubles a maximum timing advance for the time frame.

17. The method of claim 15, wherein the calculated time delay is a function of the power of an antenna used with the vehicle telematics unit.

* * * * *